(12) United States Patent
Lipton et al.

(10) Patent No.: US 7,671,889 B2
(45) Date of Patent: Mar. 2, 2010

(54) AUTOSTEREOSCOPIC PIXEL ARRANGEMENT TECHNIQUES

(75) Inventors: Lenny Lipton, Greenbrae, CA (US); Robert Akka, San Francisco, CA (US)

(73) Assignee: Real D, Beverly Hills, CA (US)

( * ) Notice: Subject to any disclaimer, the term of this patent is extended or adjusted under 35 U.S.C. 154(b) by 2026 days.

(21) Appl. No.: 09/876,630

(22) Filed: Jun. 7, 2001

(65) Prior Publication Data

US 2002/0011969 A1   Jan. 31, 2002

(51) Int. Cl.
*H04N 13/04* (2006.01)
(52) U.S. Cl. .............................................. 348/51
(58) Field of Classification Search ............... 348/51, 348/58, 59
See application file for complete search history.

(56) References Cited

U.S. PATENT DOCUMENTS

| | | | | |
|---|---|---|---|---|
| 3,409,351 A | | 11/1968 | Winnek | 353/7 |
| 4,668,063 A | | 5/1987 | Street | 354/112 |
| 4,757,350 A | | 7/1988 | Street | 355/22 |
| 5,519,794 A | | 5/1996 | Sandor et al. | 382/285 |
| 5,681,676 A | * | 10/1997 | Telfer et al. | 430/22 |
| 5,969,699 A | * | 10/1999 | Balram et al. | 345/10 |
| 6,023,263 A | * | 2/2000 | Wood | 345/581 |
| 6,055,012 A | * | 4/2000 | Haskell et al. | 348/48 |
| 6,064,424 A | * | 5/2000 | van Berkel et al. | 348/51 |
| 6,069,650 A | * | 5/2000 | Battersby | 348/59 |
| 6,157,424 A | * | 12/2000 | Eichenlaub | 349/74 |
| 6,262,743 B1 | * | 7/2001 | Allio | 345/427 |
| 6,385,244 B1 | * | 5/2002 | Morad et al. | 375/240.16 |
| 6,476,850 B1 | * | 11/2002 | Erbey | 348/51 |
| 6,487,020 B1 | * | 11/2002 | Favalora | 359/619 |
| 6,573,928 B1 | * | 6/2003 | Jones et al. | 348/51 |
| 6,590,605 B1 | * | 7/2003 | Eichenlaub | 348/51 |
| 6,801,243 B1 | * | 10/2004 | Van Berkel | 348/59 |

FOREIGN PATENT DOCUMENTS

EP      0 791 847 A1    2/1997

OTHER PUBLICATIONS

Gonzalez/Woods, Digital Image Processing, Addison-Wesley Publishing, 1992, pp. 194-197.*

* cited by examiner

*Primary Examiner*—David Czekaj
(74) *Attorney, Agent, or Firm*—Baker & McKenzie LLP

(57) ABSTRACT

An autostereoscopic display system wherein an interdigitated stereogram is generated and displayed on an electronic display. The display includes a lenticular screen over the surface of the display which allows the user to observe the stereogram on the display and obtain a true stereoscopic effect. In accord with the invention, the resolution of master images is minimized and then the pixels from the master images are mapped to form the interdigitated stereogram. The optimum minimization of the resolution is obtained when the ratio of horizontal resolution to vertical resolution for the master images approximates the screen aspect ratio of the display. In this way, less computation is involved in remapping the pixels to form an interdigitated stereogram.

19 Claims, 6 Drawing Sheets

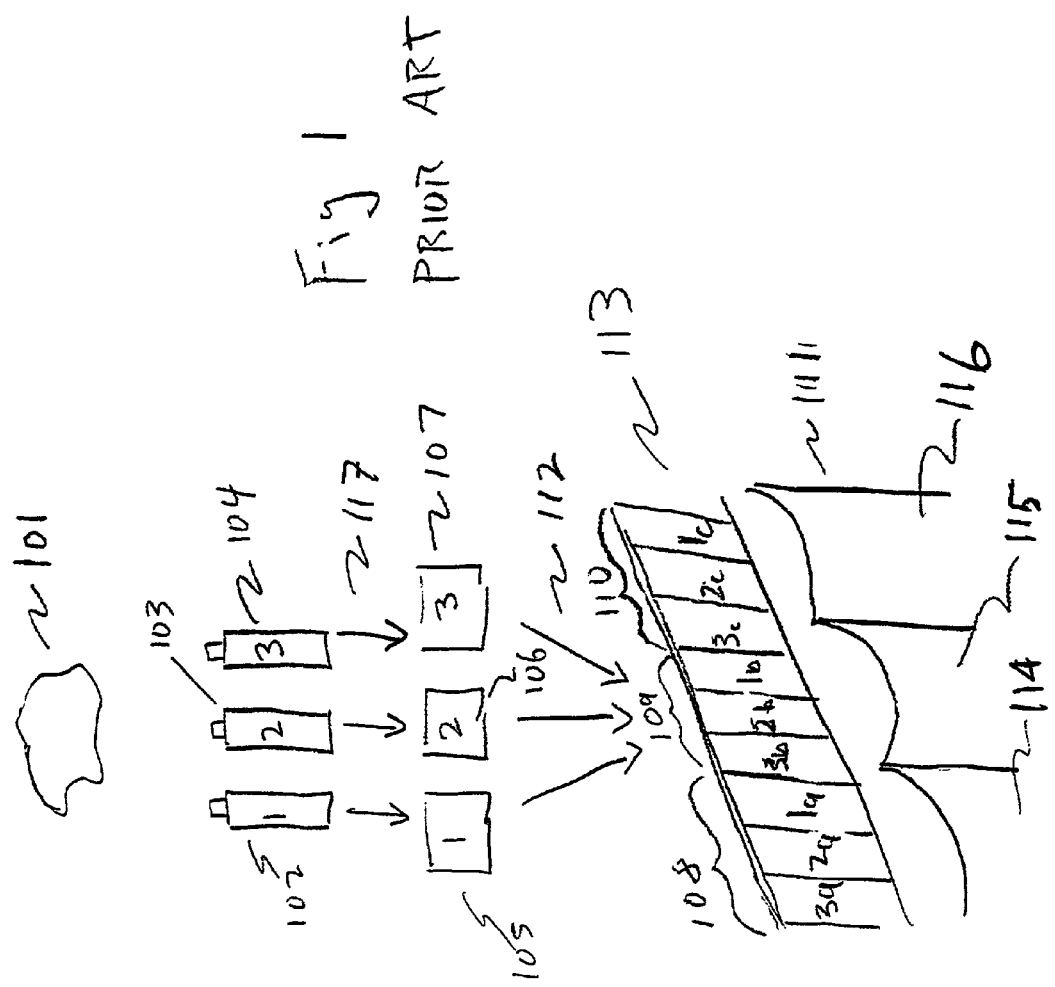

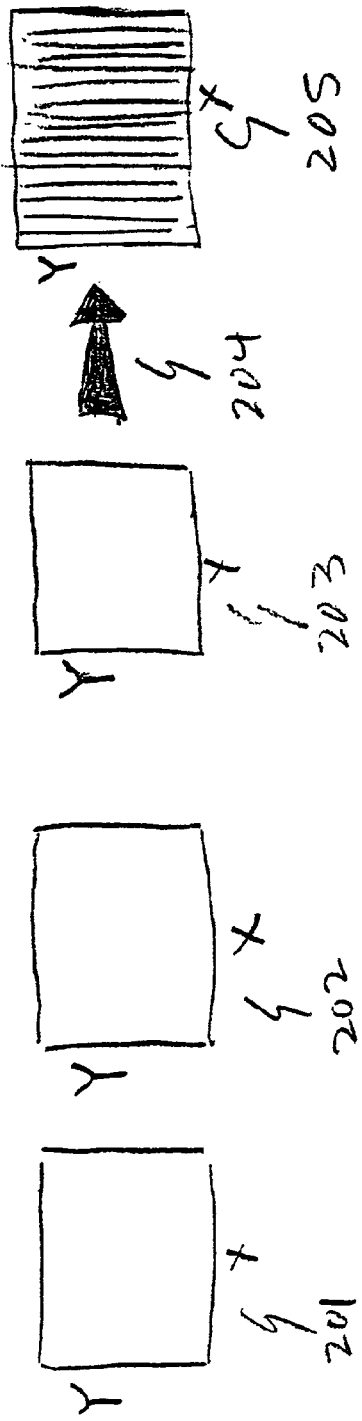

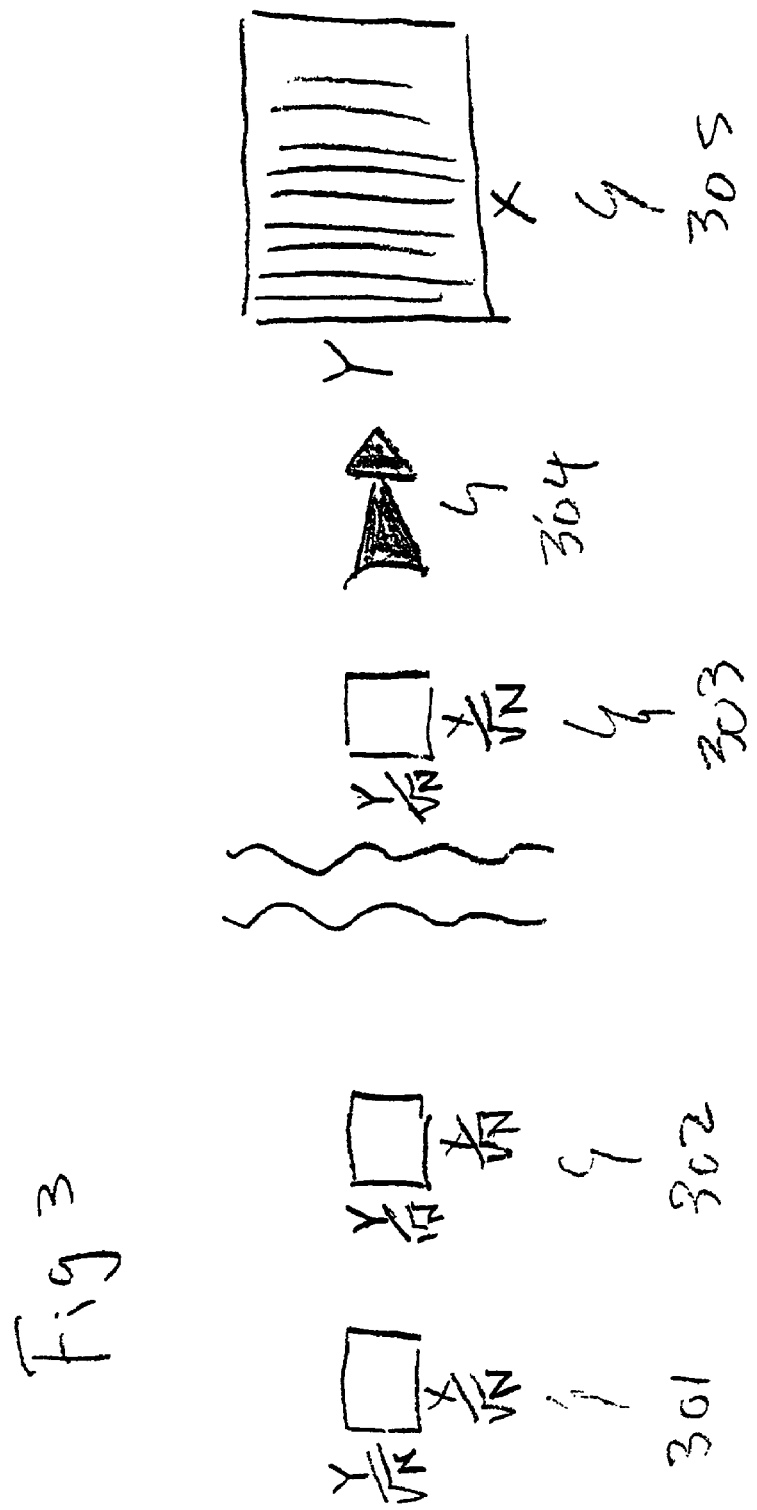

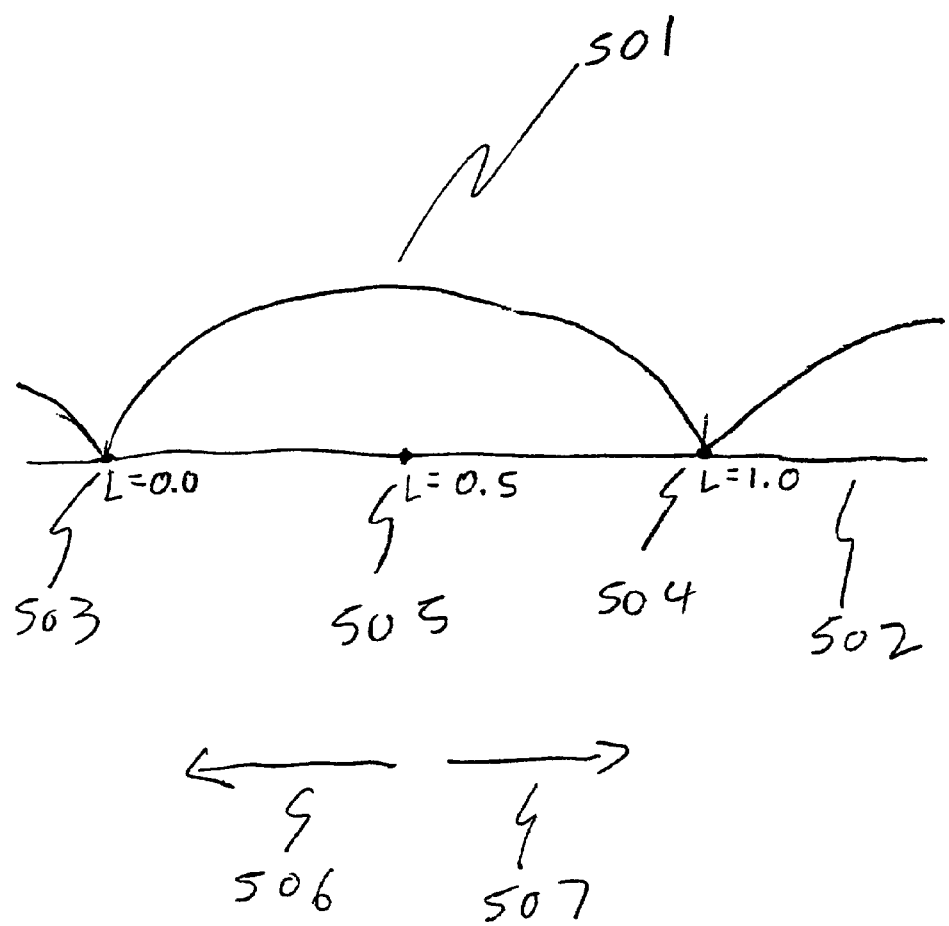

AUTOSTEREOSCOPIC PIXEL ARRANGEMENT TECHNIQUES

BACKGROUND OF THE INVENTION

Autostereoscopic displays are stereoscopic displays that do not require eyewear selection devices. Such displays have been the subject of inventive scrutiny for almost a century. An important step was taken in 1908 with Lippmann's invention of integral or fly's-eye photography that resembles holography in its effect. Since then, numerous inventors have sought to create a binocular stereoscopic illusion using an optical selection technique located at the display surface (photographic print, motion picture screen, electronic display).

The raster barrier is one approach that has benefits in terms of simplicity of fabrication and optical quality, but it suffers from low brightness. Another approach, attributed to Ives, is an offshoot of Lippmann's work, and uses a series of elongated lenslets or lenticules as a selection device. While a lenticular screen is more difficult to fabricate than a raster barrier screen, it has greater brightness. The lenticular screen has found commercial acceptance and there is substantial literature regarding this art, with interest accelerating judging by recent patent activity.

Since stereoscopic depth information is represented by horizontal parallax, Ives designed a lenticular screen, corduroy-like in structure, with lenticules having only a horizontal focal length. Unlike Lippmann's fly's-eye device, Ives' device restrained the stereoscopic image information to within vertical going sections which are placed in juxtaposition with a corresponding lenticule. Ives called his device the parallax panoramagram (it's also known as the lenticular stereogram) because, in addition to the stereoscopic effect, since multiple views are provided, the resulting display has a look-around capability (if only in the horizontal direction). The term view in this disclosure refers to a single one of the multiple individual perspective images that make up the content of the lenticular display.

Although this look-around capability is interesting, the value of having multiple views is that the result is an acceptable viewing zone. The look-around capability is of secondary importance, since the observer's mobility is usually limited. Look-around capability is an attribute of the multiple perspective nature of the display, without which there could not be an extended viewing zone.

There have been many attempts to perfect the parallax panoramagram. The technique has taken on various embodiments and has been used for commercial portraiture, amateur photography, and in mass-produced printing for advertising, novelties, magazine and book illustrations.

The art of producing parallax panoramagrams has progressed because it provides advantages such as a good stereoscopic effect, adequate viewing angle, full color, good sharpness (at least for the principal area of interest, usually having low parallax values), and decent mass manufacturing techniques have been developed. Nevertheless, an examination of panoramagram images produced fifty years ago and those produced today shows no improvement in stereoscopic effect and image quality.

Although the result resembles that produced by a stereoscopic hologram, the panoramagram does not require laser light for photography, has no speckle noise, and has superb color reproduction. In almost every way, panoramagram images are superior to hologram images. The single way in which holograms excel is that they can have a greater viewing zone.

One improvement to the art forms a panoramagram by combining individual images created in a perspective sequence by a multiple camera array. This technique directly enables the current efforts to create lenticular stereograms by means of computer technology. Prior to this improvement, panoramagrams were photographed with a moving camera having a moving shutter made up of Ronchi-grating-like slits, or with a camera and a horizontal going slit-aperture and lenticular screen at the film plane. These and other approaches shared one common approach: they turned temporal parallax into spatial parallax. A disadvantage of this technique is that it requires a subject that does not move since the exposure takes place over a period many seconds. The multiple camera approach, on the other hand, allows for a series of exposures of the required perspectives taken at the same instant so that moving subjects may be photographed. Hence the multiple views required for a panoramagram are produced as individual images which are combined to simulate the panoramagram effect.

The advantage of the original panoramagram, in which parallax is captured temporally, is that it provides a kind of continuum of views from the leftmost to the rightmost perspective. Upon viewing the panoramagram, when moving one's head to the left or to the right, the result is a continuously varying perspective change like that which occurs in the visual world. The term a kind of continuum is used because, in fact, the image changes from left to right are discrete since the image recording medium, namely silver-based photographic materials, have a finite resolution resulting from well understood optical and photographic limitations.

Workers in the field realized that a panoramagram can be synthesized from interdigitated or vertically sliced and assembled component elements. They accomplished this slicing and rejuxtapostioning of image sections optically. This process is called interdigitation in this disclosure, but elsewhere it is sometimes referred to as interleaving.

FIG. 1 shows the gist of the procedure, in an abbreviated form, since the technique is thoroughly covered in the prior art literature. The purpose of this explanation is to give some background and context to the invention disclosed without necessarily serving as a tutorial.

Subject 101 is photographed by a camera array made up of cameras 102, 103, and 104 (cameras 1 through 3). For purposes of illustration, the number of cameras and images is restricted to three, but as the reader will understand, the number is arbitrary and used in order to simplify the explanation.

Photographs 1, 2, and 3 (105, 106 and 107) of subject 101 are produced by respective cameras 102, 103 and 104. These perspective views are called master images. In some contexts, the master image may be referred to as a component image to emphasize that it is being operated on as one of a series of images. The arrows 117 connecting the cameras with their respective master images indicate the photographic process. The master images are sliced vertically into multiple segments and then aligned next to each other as indicated by arrows 112. The result 113, is the print component of the interdigitated stereogram that replicates the characteristics of the panoramagram. We refer to bracketed sections 108, 109 and 110 as columns, and each column contains, in this case, three stripes, 1, 2, and 3. The stripes are signified as 3a, 2a, 1a, and then 3b, 2b, 1b, and so on, to indicate that they come from different portions of the images 105, 106, and 107.

The stripes are inverted with the left perspective view at the right end of the column and the right perspective view at the left end of the column because of the optical inversion caused by the individual lenticules 114, 115, and 116 of lenticular screen 111. Lenticular screen 116 is made up of refractive elements which have a horizontal focal length only, and these elements or lenticules 114, 115, and 116, allow the left and right eyes to see the perspective views required for a stereoscopic image. Each lenticule is juxtaposed with an associated column and its stripes. Thus, lenticule 114 is associated with column 108 and its stripes 3a, 2a and 1a; lenticule 115 is associated with column 109 and its stripes 3b, 2b and 1b; and lenticule 116 is associated with column 110 and its stripes 3c, 2c and 1c.

It is easy to imagine the master images (if they are paper prints) 105,106, and 107 being sliced up with a scissors and then laid next to each other side-by-side and pasted together with this sequence repeating for other segments of the photographs in the sequence of columns described above. If indeed this were the method employed to create the interdigitated stereogram, and none of the slices was discarded, the resultant interdigitated image would be three times as wide as the original master images 105, 106 and 107, receptively. The resultant image would be anamorphically stretched and would look peculiar. Therefore, only one out of every three strips cut up from images 1, 2, and 3 needs to survive to result in an undistorted image. The purpose of this scissors and paste explanation is expository, but we will return to this example and the principles inherent in it.

Until recently, workers in the field interdigitated master images optically. With the widespread use of the computer, there has been a substantial extension of the art because the computer can be made to emulate scissors and paste or optical techniques and can easily re-scale images anamorphically. The image may be re-scaled in either the vertical or the horizontal direction to result in images that are not anamorphically stretched, or, stripes (or pixels) might be thrown out to obtain the same result. The beautiful thing about computer techniques is that they can be used in algorithms that break up a large and complex series of operations into smaller manageable units of computation. The algorithms are then able to operate on a pixel by pixel level to reshuffle, average, or rearrange pixels to conform to the topological needs of our specific problem.

It has been assumed in the above description that we are using the classical and almost universally employed Ives' technique in which the lenticules are oriented so that their boundary edges are parallel to the vertical edge of the display or print. In 1968, Winnek made a tremendously important improvement as disclosed in U.S. Pat. No. 3,409,351. In his variation, the lenticules and associated columns and stripes are laid down at a diagonal or at some angle relative to the edge of the print or display.

The purpose of the Winnek improvement is to increase the horizontal resolution of the display and to reduce or eliminate moire patterns resulting from the optical interaction of lenticular screens. Winnek was concerned with means for copying and resizing (enlarging) lenticular stereogram prints. Winnek's idea is used by Street, as disclosed in U.S. Pat. Nos. 4,668,063 and 4,757,350. Sandor et al. applies the Winnek concept to raster barrier displays as disclosed in U.S. Pat. No. 5,519,794. Sandor is concerned with increasing the horizontal resolution of the display.

From Winnek, we learn that "the present invention is designed to afford means . . . whereby moiré and other unwanted patterns are avoided in the ultimate print." Winnek also discusses the improvement in sharpness made possible by the technique. Sandor is explicit about the benefits, stating that "This rotation results in increased numbers of images per unit pitch, by trading vertical for horizontal resolution."

Given Winnek's disclosure, it is a short step to apply the idea to flat panel displays, as was done by van Berkel in European Patent Application 97200399.0. Van Berkel uses a perfect fit approach since his combination of pixels and lenticules must be juxtaposed with high precision in order for the process to work. As the reader shall see, our techniques use the more forgiving approaches of best fit and pixel averaging.

Interestingly, unlike the art described by van Berkel, which requires slanted Winnek lenticules, our approach works with slanted or non-slanted lenticules. For paper prints using common desktop printers, the resolution is so high there may well be little or no advantage to using the Winnek technique. However, for flat panel displays in which the pixel density is much lower, the Winnek technique definitely works best to reduce the effect of distracting moire patterns and to increase the horizontal resolution.

One point of comparison with van Berkel reveals that our techniques work with slanted lenticule systems in which there are repeating groups of display pixels, though our techniques can also work with systems where that is not the case. Our techniques apply regardless of the angle of lenticular slant, even if the amount of lenticular slant is zero degrees, as mentioned above. Our techniques apply regardless of the pitch of the lenticular elements.

Another comparison with van Berkel indicates that our techniques do not address the shape or other characteristics of the lenticular element. However, we do assume that the optical properties of the lenticular element are such that, if a range of views appears underneath a lenticular screen with right-eye views towards the left edge of each lenticule and left-eye views towards the right edge of each lenticule, distributed more or less linearly, then the image will appear stereoscopic.

Comparing further with van Berkel reveals that our techniques apply whether the interdigitated "pixels" are whole RGB (red, green, blue) pixels or single-color sub-pixels. Our techniques are not particular to any given style of color sub-pixel layout, or a particular sub-pixel layout. If the location of a pixel or sub-pixel can be calculated with respect to the placement of the lenticular elements, then our techniques apply.

FIGS. 4a and 4b illustrate Winnek's system. In FIG. 4a, we see interdigitated print or display surface 404 made up of columns 401, 403, 403 with each column having its associated series of stripes 3a, 2a, and so on, as described above with respect to FIG. 1. Each column is in juxtaposition with its appropriate lenticule 406, 407 and 408 of lenticular screen 405. Unlike the arrangement shown in FIG. 1 in which the boundary edge of the lenticular columns is parallel to the vertical edge of the display, the lenticules, or more properly the lenticular boundaries, are tipped at some angle $\Phi$ to the vertical going edge of the display. The columns, stripes, and lenticules are all tipped at an angle $\Phi$, formed by the running edge of the column, stripe, or lenticule, with the vertical edge of the print or display. For a Winnek system display, $\Phi$ is greater than zero but less than ninety degrees.

FIG. 4b shows the overall view and possibly more clearly illustrates the geometry. Display or print 409 is made up of columns 411, which are parallel to the lenticules and which are tipped to the vertical edge 412 of the display 409 by angle $\Phi$, which is preferably between five and ten degrees.

Interest in the medium has waxed and waned over the years. In the past ten years or so, many patents have been issued in the field, most probably because of three developments: The personal computer, desktop printers, and flat panel displays. Not only do these inventions create additional possible applications, but they also allow inventors to vary image parameters and view the results rapidly. Moreover, these technologies allow for new approaches to interdigitate image elements, which have advantages over the optical equivalent. For one thing, the technique lends itself to computer generated image applications with a three-dimensional database.

Prints made on desktop printers and images produced on flat panel displays share an interesting characteristic: their pixels are specified and located by means of a Cartesian grid and they have a flat surface. Cathode ray tube displays, on the other hand, are usually not flat and the location of each pixel with exact specificity cannot be guaranteed. However, modern printers and flat panels overcome these objections because of the intrinsic nature of these display devices.

The present disclosure, in part, presents a means for reducing the amount of information required in the master images. An interesting example of prior art is U.S. Pat. No. 6,023,263 to Wood. The essence of this patent is that, rather than rendering N different views of a scene, all at high quality, Wood would render 2 (or perhaps more than 2 but less than N) views of the scene. Wood would then obtain the other scene views by deriving one scene view from a different scene view's actual rendering.

Thus, in a 4-view example, views 2 and 3 would be rendered normally, and then views 1 and 4 would be calculated, not by doing two additional renderings, but by applying displacements to regions of views 2 and 3. This would require some integration of Wood's technique with the actual rendering routines utilized. Conversely, the technique of the instant invention would generate all 4-view (generally speaking N-view) renderings using standard rendering methods, except at a lower resolution than the final overall resolution.

The advantage of the Wood technique over that which is disclosed here is that it has the potential to reduce rendering overhead considerably. The advantage of our technique is that it is more versatile, particularly when used with standard rendering software. In point of fact, in such a useful and important case, applying the Wood art would be inconvenient or impossible.

In the most general sense, the present invention describes creating an autostereoscopic display using a lenticular screen as a selection device. The lenticules may follow the traditional vertical going arrangement, in which the boundary edge of the lenticules is parallel to one edge of the display, first enunciated by Ives, or the improvement using a slanted or tipped angle for the lenticules with respect to one edge of the display. Generally, for flat panels and their sparse pixel density, Winnek's approach has advantages. In addition, these displays tend to have black interstices between the pixels, the visibility of which tend to be exacerbated by vertical going lenticules because of their horizontal magnification. Happily, tipping the lenticules, as described by Winnek, reduces the visibility of the interstices.

The invention consists of two related components that together form the basis for a practical autostereoscopic display with excellent pictorial quality. The first portion of the invention specifies means for minimizing the information content of master images with distinct perspective views, and the second concerns itself with re-mapping the pixels of those master images to conform to the needs of the selection device.

Because the master images are created according to our prescription for minimum content while creating an excellent pictorial result, the rendering time for a graphics application is not increased compared to a conventional planar rendering. This is an important consideration in many applications in which no sacrifice in smoothness of animation or interactivity can be tolerated by demanding users.

SUMMARY OF THE INVENTION

The present invention is a method and apparatus for providing an autostereoscopic display system. In an autostereoscopic display system, an interdigitated stereogram is generated and displayed on an electronic display. The display includes a lenticular screen over the surface of the display, which allows the user to observe the stereogram on the display and obtain a true stereoscopic effect.

In accord with the invention, the resolution of the master images is minimized and then the pixels from the master images are mapped to form a interdigitated stereogram. The optimum minimization of the resolution is obtained when the ratio of horizontal resolution to vertical resolution for the master images approximates the screen aspect ratio of the display. In this way, less computation is involved in remapping the pixels to form an interdigitated stereogram.

BRIEF DESCRIPTION OF THE DRAWINGS

FIG. 1 shows the prior art method of image capture and processing required for an interdigitated Ives' Panoramagram.

FIG. 2 shows the prior art means used to interdigitate master images using computer techniques.

FIG. 3 shows a compression/decompression technique in accord with the present invention.

FIG. 5 is a representation of the location of a pixel with respect to single lenticule.

DETAILED DESCRIPTION OF THE INVENTION

In the course of developing the present invention, we have applied the inventive techniques to both hardcopy prints and flat panel displays. In the case of prints, an Alps dye sublimation and Epson inkjet printers were used in conjunction with lenticular screens available off-the-shelf which were laminated to the surface of the print. As is typical, the lenticules were oriented parallel to the edge of the print, as in a traditional Ives' panoramagram. In the case of the flat panel display, we used a Silicon Graphics flat panel LC monitor with a 17-inch diagonal screen, and the technique disclosed by Winnek was used to increase horizontal resolution and reduce the moire patterns.

Our compression/decompression and pixel mapping schemes were used for both prints and flat panels. While we reduce the resolution of the master images, we do not reduce the pictorial image quality of the final autostereoscopic image. It is important to be able to reduce the resolution of the master images while retaining the final image quality for two major imaging applications—interactive computer graphics and camera-originated or video images.

In the case of computer-generated images, the rendering time or time to produce an image is vastly reduced using our technique. If we had to use master images that were full resolution, the computations to produce views would be increased by N-fold, where N is the number of master images. Users of interactive computer graphics have come to expect that they will be able to manipulate and change images in virtually real time, and any additional delay imposed by the requirements of an autostereoscopic display diminishes the utility and acceptability of such a display.

In the actual re-mapping or interdigitation operation, the number of R, G and B pixel components that need to be processed stays the same as long as the final resolution remains unchanged. The source images are just being sampled in a different way. The real savings are in rendering time and memory related overhead.

Figure 6:
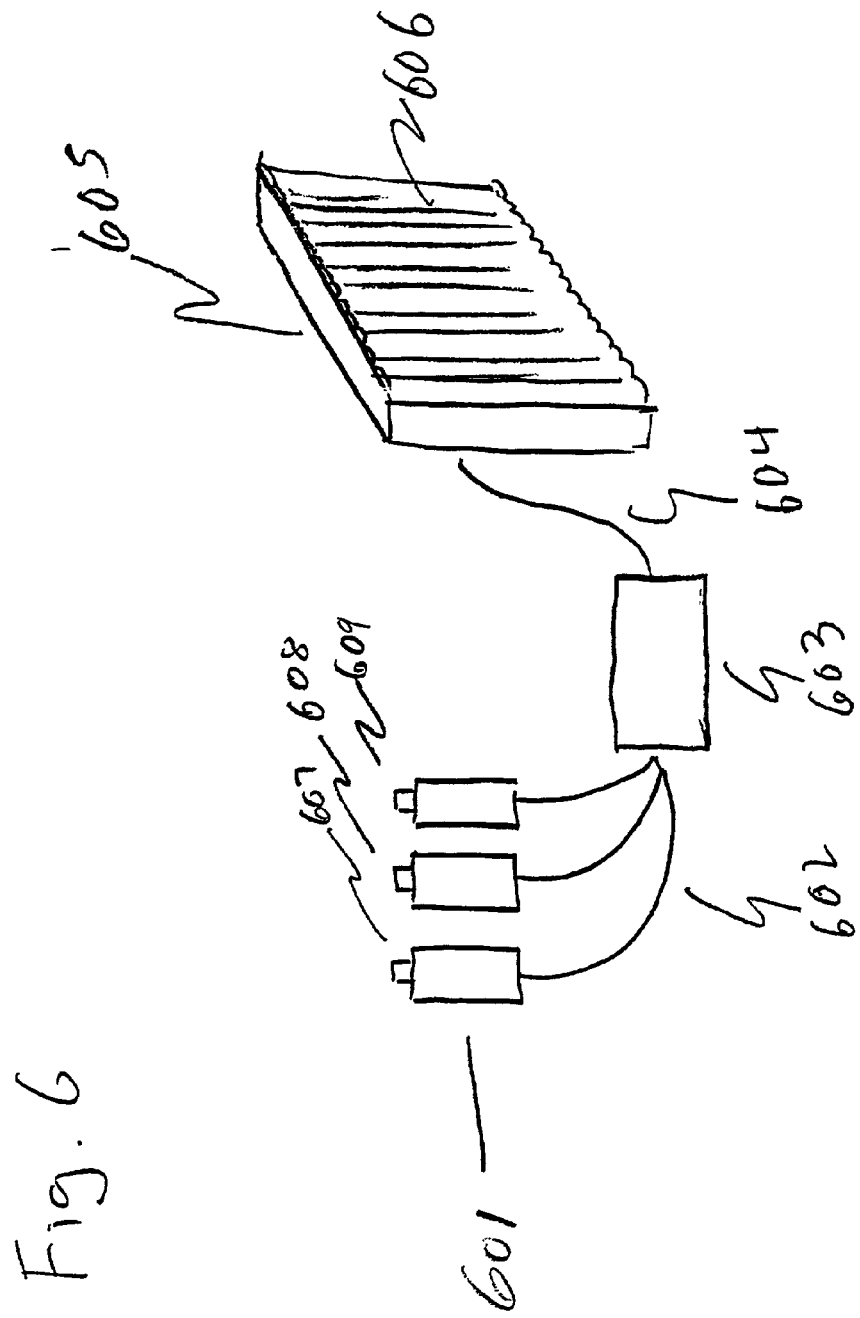
FIG. 6 shows an arrangement of camera heads to form a device for capturing video images in accord with the present invention.

For the case of a camera-produced image, it is equally important to be able to use master images that are of substantially lower resolution than that of the final display. FIG. 6 shows an arrangement of video cameras that is similar to that shown in FIG. 1 (which are still cameras). The camera 601 is made up of three heads 607, 608, 609 that connect via cables 602 to electronics box 603. The box performs the pixel mapping described below to produce a video stream communicated by means of cable 604 to flat panel monitor 605 which is displayed autostereoscopically by means of lenticular screen 606.

We use standard off-the-shelf NTSC or PAL video cameras. The reasons for using standard cameras (with a resolution which is a fraction of that of the final display screen) are similar to that given above for computer-generated images. While the image is not being computer generated, the compression/decompression scheme is used, as described below with the aid of FIG. 3. Here we are able to start off with, to great advantage, lower resolution cameras (lower than the final display screen) without sacrifice of image quality. In other words, there is no advantage to using high-resolution cameras in this situation and our work proves that the standard resolution cameras suffice.

In the case of the Silicon Graphics monitor used above, the resolution is 1600 by 1024 pixels. Cameras that can produce master images of such high resolution are available but they are costly and usually large. It is important to reduce the cost of the cameras for reasons of commercial acceptability, and the width of modern high resolution or HDTV cameras is too great to be of practical use in a camera array in FIG. 6.

Our experience tells us that for the usual subject at usual distances for general-purpose photography, the cameras should be placed so that the maximum spacing from leftmost to rightmost lens is from two to twelve inches depending upon the subject and its distance from the camera. This cannot be accomplished with HDTV cameras that are a foot or more wide.

FIG. 2 shows how one would expect to create a prior art lenticular autostereoscopic image from master images. The final image 205 has a vertical by horizontal resolution of X by Y pixels (the vertical lines are meant to suggest columns and stripes), as is the case for master images 201, 202 and 203. For simplicity we show only three master views, but any number N views may be represented as well. In this example, an image of X by Y resolution is interdigitated by some means as indicated by the "process" arrow 204. This is a computationally intensive technique, especially in the case of a high-resolution display such as the 1600 by 1024 flat panel monitor (1,638,400 pixels) mentioned above, given that the master images are also of 1600 by 1024 resolution. However, the truly significant disadvantage of the process is that the application software must render or create N master views of 1600 by 1024 resolution, which will take N times longer than that which would have been required to render or compute but one view.

The conventional image rendering of N views for an autostereoscopic display would have taken N times longer than that required for a single standard image of X by Y. In our experiments, we established that a marked reduction in resolution of the master images resulted in an autostereoscopic image that was indistinguishable from one produced with full resolution masters.

In one set of experiments, we used a Winnek-type display with nine views, hence nine master images were required. The display was adjusted so that the X and Y resolution of each stereo view remained approximately in proportion to the display's aspect ratio. A more precise way of putting this is that we desire to have the ratio of the horizontal and vertical resolution of the display closely match the screen aspect ratio.

We therefore had nine images simultaneously displayed with a resolution of about 533 by 341 pixels (rounding the numbers to be integer values). The aspect ratio of the views is 1.56:1, which is the aspect ratio of the overall display, and (533 pixels)(341 pixels)(9 views)=1,638,000, or approximately the same total number of pixels available on the monitor used in the experiment.

We point out that sharpening of the full or reduced resolution images is beneficial. By sharpening, we mean the contrast enhancement of adjacent pixels, such as that implemented in Adobe PhotoShop 5.5 under the filter function labeled unsharp mask. With appropriate sharpening of the reduced resolution master images, it is possible to make them appear to be indistinguishable from an autostereoscopic image derived from full resolution master images.

Below we discuss how the master image pixels are remapped to produce views to meet the needs of both the Ives and the Winnek system.

Given nine master views, we established that master images of one ninth resolution resulted in lenticular autostereoscopic images which are indistinguishable from the prior art process described and illustrated in FIG. 2.

What we established experimentally may also be understood with reference to FIG. 3, in which we illustrate a generalization of our results. Each master image has a reduced resolution equal to X divided by $\sqrt{N}$ and Y divided by $\sqrt{N}$, where N is number of master images. In other words, each master image has one Nth (1/N) the resolution of the final lenticular display. Therefore, each view has 1/Nth resolution of the full screen resolution.

One skilled in the art will understand how to depart from these specific results without greatly departing from the teachings of this invention. For example, in the case of nine views, the images might well have one-tenth the resolution of the final display, or one-eighth the resolution and the application of such numbers do not detract from the generality of the result.

In the case of a Winnek display where a stereo view's X and Y pixel count can be adjusted to remain in proportion to the display's aspect ratio, the master images may have the same resolution as that of the views. Indeed, to use more resolution is wasteful of needed resources.

The example discussed here for a Winnek system is the more general case than that in which $\Phi=0°$, which we call an Ives system. In the example given above, the X and Y resolution remains proportional to the display aspect ratio. For the Ives system, this usually is not true because displays typically have an isotropic distribution of pixels, with a homogeneous density of pixels in the horizontal and vertical directions. In the case of nine views, applying it to the exemplary monitor with a pixel resolution of 1600 by 1024, each resultant autostereoscopic Ives' view would have a resolution of 178 by 1024 pixels. From the point of view of a display designer, this is not a desirable specification.

The Winnek system has the ability to transfer vertical pixels to horizontal resolution, and for this reason it is desirable for displays in which the pixel density is low and, as is typical, uniform in the vertical and horizontal direction, or what we have termed isotropic. For the case of a paper print made with a desktop printer with the modest ability to print 600 by 600 pixels per inch, or 6000 by 4,800 pixels for an 8 by 10 inch piece of paper, we may safely use the Ives approach. If we did, for nine views, we would have a display that had 667 pixels horizontal by 4,800 vertical, an odd sounding distribution, yet one with enough horizontal pixels per view to make the image acceptable.

For Ives' system images, the approach to take with computer-generated images is to save computational power and time by producing images from applications that are restricted in terms of horizontal resolution, since it is not possible to increase the horizontal resolution in this case. In fact, the disproportionately high vertical resolution is of no benefit.

We turn our attention to the second portion of the invention concerning re-mapping or interdigitation of the master or component image pixels to create an autostereoscopic image. Interdigitation is accomplished by sampling the appropriate pixels from the set of master images.

Our interdigitation model starts with N rendered master images, each image consisting of a grid of RGB pixels (meaning that each pixel has a red intensity value, a green intensity value, and a blue intensity value). These N master images will be interdigitated into a single multiple view image consisting of a grid of either distinct RGB pixels, or distinct sub-pixels having a shade of only one primary color (for example, a sub-pixel may be a red-only, green-only, or blue-only portion of a full-color RGB pixel group).

Figure 4B:
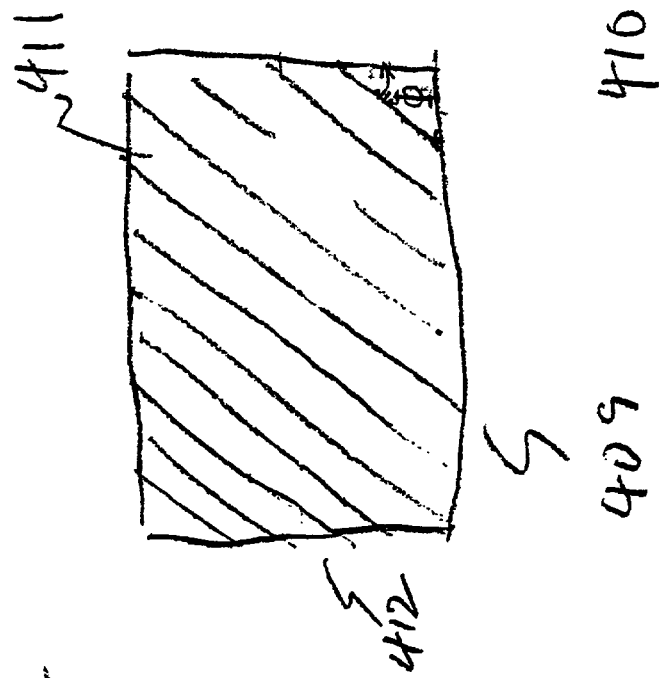
FIG. 4 shows Winnek's prior art system for angular tipping of the lenticules and columns with respect to the vertical edge of the display.
Figure 4A:
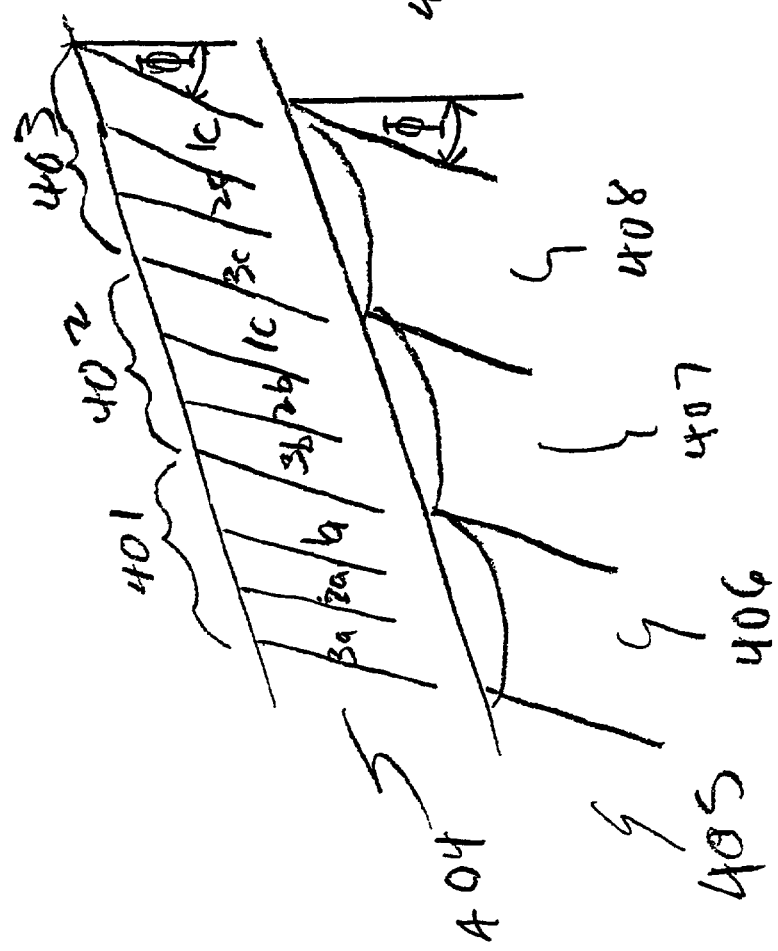

We recall that it is the additive mixture of the RGB sub-pixels, or triad, that produces the wide variety of colors which can be displayed on a flat panel monitor. The triad may be spatially arranged in different patterns, as has been demonstrated in various products The RGB pixels may be arranged with each pixel at the vertex of a triangle, or they may be stacked vertically or horizontally or in various other tessellation patterns. The eye doesn't care as long as the pixels are in close proximity and the eye is unable to resolve the individual sub-pixels. It is this factor that allows us to rearrange the sub-pixels into various tessellation patterns. This, when taken together with the Winnek system of rotating the lenticular screen by angle $\Phi$, as shown in FIG. 4, allows us to obtain the desired result—to make the ratio of the horizontal and vertical resolution (pixel count) of the display closely match the screen aspect ratio.

In creating the interdigitated image for autostereoscopic viewing, we need to determine two things for any given distinct pixel or sub-pixel in the final image: from which master image(s) should image information be obtained, and which pixel(s) should be selected from appropriate master image(s)?

The question of which master image(s) should be utilized for obtaining information for a particular interdigitated sub-pixel or pixel is determined by where that interdigitated sub-pixel or pixel will reside relative to a lenticule that is part of a lenticular screen.

With respect to FIG. 5, arrow 506 indicates the direction of right-eye views and arrow 507 indicates the direction of left-eye views on display surface 502 which are under and in immediate juxtaposition with lenticule 501. Lenticule 501 is a single representative lenticule of a larger lenticular sheet. We define the position of a distinct sub-pixel or pixel underneath a lenticule 501 with the value L, where L=0.0 corresponds to point 503 and puts the center of the sub-pixel or pixel along the left edge of the lenticule; where L=1.0 corresponds to point 504 and puts it along the right edge of the lenticule; and where L=0.5 corresponds to point 505 and puts it mid-lenticule. Then, the best fitting master or component image C out of the N master images is given by:

$$C=(1-L)\times(N-1)$$

where the first master image, numbered 1, represents a far-left-eye view and the last master image, numbered N, represents a far-right-eye view. For example, if N=21 master images, and the center of the sub-pixel being computed resides ⅓ of the way from the left edge to the right edge of the lenticule that sits above it, then the best fitting master image for obtaining that the value of that sub-pixel is $(1-0.333)\times(21-1)$, or 13.33, which we would round to the nearest integer, namely master image number 13.

In some situations where the number of master images N is relatively small, it may be useful to apply averaging of pixel values from more than one master image. To do this, we replace L, which represents the position of the center of the sub-pixel or pixel relative to the lenticule above it, with $L_1$ and $L_2$:

$$L_1=L-R/2$$

$$L_2=L+R/2$$

where R is the horizontal width of the sub-pixel or pixel relative to the horizontal width of the lenticule. Alternatively, R could be set to be smaller or larger than the actual sub-pixel or pixel width. Note that if $L_1<0.0$, 1 should be added to it so that $L_1$ is greater than or equal to 0.0, and if $L_2>1.0$, 1 should be subtracted such that $L_2$ is less than or equal to 1.0. We then calculate:

$$C_1=(1-L_1)\times(N-1)$$

$$C_2=(1-L_2)\times(N-1)$$

For example, if N=21 master images, and the center of the sub-pixel being computed resides ⅓ of the way from the left edge to the right edge of the lenticule that sits above it, and the horizontal width of the sub-pixel is 1/10 of the horizontal width of the lenticule, then L=0.333, R=0.1, $L_1$=0.333−0.05, $L_2$=0.333+0.05, $C_1$=(1−0.283)×20=14.33, and $C_2$=(1−0.383)×20=12.33. Based on this calculation, we have a range from $C_1$ to $C_2$, or from 14.33 down to 12.33 in this example. This means that we need to apply a weighted average to pixel values obtained from components $C_1$ to $C_2$, or in the example, master images 14, 13 and 12. The appropriate proportional weightings in the example would be as follows:

master image 12=(12.5−12.33)/(14.33−12.33)=0.085 weighting master image 13=(13.5−12.5)/(14.33−12.33)=0.500 weighting master image 14.=(14.33−13.5)/(14.33−12.33)=0.415 weighting The question of which pixel(s) from the appropriate master image(s) should be used is determined simply by mapping the desired interdigitated sub-pixel or pixel being calculated to each of the one or more appropriate master image(s). For example, if the calculation above determines that the appropriate master image is image 13, then the pixel value to be taken from image 13 should be determined by mapping the location of the pixel or sub-pixel in the final to-be-interdigitated image to the coordinates of master image 13. In most cases, the best fitting pixel mapped from each master image should be used, though it might sometimes be appropriate to do a weighted average of the values of several pixels that map to the desired range.

Depending on the application, the master images may be the same size as the final interdigitated image, or, particularly with real-time applications, where computation performance is important, as described above, the master images may be smaller than the final interdigitated image. In either case, pixels should be mapped proportionally from the appropriate master image(s) to the interdigitated image.

For example, let us assume that an interdigitated image being calculated has a grid of 4800 sub-pixels horizontally (which would be the case if the horizontal display resolution was 1600 complete RGB pixels, and each of those 1600 pixels consisted of three distinct single-color sub-pixels), and 1024 sub-pixels vertically, and that the master images each have a smaller resolution of 520 pixels horizontally by 340 vertically. To calculate the value of interdigitated sub-pixel (X,Y), the best fitting master image pixel would be (X×520/4800, Y×340/1024), where the lower-left pixel in all cases is (0,0).

The above techniques apply regardless of whether the lenticules are parallel to the pixel columns of the display device or slanted relative to the pixel columns. The only difference between lenticules that are not slanted and lenticules that are slanted is that a slanted lenticule implementation needs to consider the amount of slant in order to properly calculate the horizontal position L of a pixel relative to the lenticule that is placed above it.

Finally, note that if the interdigitated sub-pixel being calculated is red-only, green-only, or blue-only, then only the appropriate color element from the master image pixel(s) should be used.

We claim:

1. A method for generating content for an autostereoscopic display, comprising the steps of:
    obtaining a plurality of master images,
    reducing resolution of each master image to be a fraction of the resolution of the autostereoscopic display, where the autostereoscopic display has a predefined screen aspect ratio, and wherein said reducing comprises generating each reduced resolution master image based on a quantity of master images obtained, wherein a ratio of horizontal resolution to vertical resolution for each reduced resolution master image approximates the predefined screen aspect ratio, and
    mapping selected pixels from the reduced resolution master images to form an interdigitated stereogram, wherein pixels are selected from each reduced resolution master image in correspondence with their position under a lenticule in the interdigitated stereogram; and
    wherein the quantity of master images obtains is N, and for a master image having dimension X by Y, a corresponding reduced resolution master image has a dimension of approximate proportion $X/\sqrt{N}$ by $Y/\sqrt{N}$.

2. A method as in claim 1, further comprising enhancing the contrast of adjacent pixels in the master images.

3. A method as in claim 1, wherein the autostereoscopic display is operable to display stereoscopic images having a resolution of X by Y pixels.

4. A method as in claim 1, wherein the autostereoscopic display is operable to display N views.

5. A method for generating content for an autostereoscopic display, comprising the steps of:
    obtaining a plurality of master images;
    reducing resolution of each master image to be a fraction of the resolution of the autostereoscopic display, where the autostereoscopic display has a predefined screen aspect ratio, and wherein said reducing comprises generating each reduced resolution master image based on a quantity of master images obtained, wherein a ratio of horizontal resolution to vertical resolution for each reduced resolution master image approximates the predefined screen aspect ratio; and
    mapping selected pixels from the reduced resolution master images to form an interdigitated stereogram, wherein pixels are selected from each reduced resolution master image in correspondence with their position under a lenticule in the interdigitated stereogram; and
    wherein the master image C having a pixel in position L is given by $C=(1-L)\times(N-1)$, where L represents the far left-eye view and where N represents the far right-eye view.

6. An auto stereoscopic display system for generating stereoscopic images having a resolution of X by Y pixels, comprising:
    N cameras each generating a master image having a resolution of approximately $X/\sqrt{N}$ by $Y/\sqrt{N}$;
    a pixel mapper electronically coupled to the cameras, whereby selected pixels from each master image are interdigitated to form an interdigitated stereogram; and
    an electronic display coupled to the pixel mapper and having a lenticular screen coupled to a surface of the display.

7. An autostereoscopic display system as in claim 6, wherein the autostereoscopic display has a predefined screen aspect ratio, further comprising a reducer for generating each master image to have a ratio of horizontal resolution to vertical resolution approximating the screen aspect ratio.

8. An auto stereoscopic display system as in claim 6, wherein a master image C having a pixel in position L is given by $C=(1-L)\times(N-1)$, where L represents the far left-eye view and where N represents the far right-eye view.

9. An autostereoscopic display system as in claim 6, wherein a range of master images $C_1$ to $C_2$ each having a pixel in position L is given by $C_1=(1-L_1)\times(N-1)$ and $C_2=(1-L_2)\times(N-1)$, where L represents the far left-eye-view; N represents the far right-eye view; $L_1=L-R/2$ and $L_2=L+R/2$; and R=the horizontal width of the pixel relative to the horizontal width of the lenticule.

10. An autostereoscopic display system as in claim 9, wherein R=the horizontal width of a sub-pixel.

11. An auto stereoscopic display system as in claim 9, wherein R is wider than the horizontal width of the pixel.

12. An autostereoscopic display system as in claim 9, wherein R is wider than the horizontal width of the pixel.

13. A method for generating content for an autostereoscopic display, comprising the steps of:
    obtaining a plurality of master images;
    reducing resolution of each master image to be a fraction of the resolution of the autostereoscopic display, where the autostereoscopic display has a predefined screen aspect ratio, and wherein said reducing comprises generating each reduced resolution master image based on a quantity of master images obtained, wherein a ratio of horizontal resolution to vertical resolution for each reduced resolution master image approximates the predefined screen aspect ratio; and
    mapping selected pixels from the reduced resolution master images to form an interdigitated stereogram, wherein pixels are selected from each reduced resolution master image in correspondence with their position under a lenticule in the interdigitated stereogram; and
    wherein a range of master images $C_1$ to $C_2$ each having a pixel in position L is given by $C_1=(1-L_1)\times(N-1)$ and $C_2=(1-L_2)\times(N-1)$, where L represents the far left-eyeview; N represents the far right-eye view; $L_1=L-R/2$ and $L_2=L+R/2$; and R=the horizontal width of the pixel relative to the horizontal width of the lenticule.

14. A method as in claim 13, wherein R=the horizontal width of a sub-pixel.

15. A method as in claim 13, wherein R is narrower than the horizontal width of the pixel.

16. A method as in claim 13, wherein R is wider than the horizontal width of the pixel.

17. An autostereoscopic display for generating stereoscopic images having a resolution of X by Y pixels, comprising:

N cameras each generating a master image;

a mapper selecting pixels from each master image based on pixel position and interdigitating the pixels to form an interdigitated stereogram; and an electronic display coupled to the mapper and having a lenticular screen coupled to a surface of the display;

wherein the mapper is configured to form the interdigitated stereogram based on N, and wherein each master image has a dimension of approximate proportion $X/\sqrt{N}$ by $Y/\sqrt{N}$.

18. An autostereoscopic display system as in claim 17, wherein pixels are selected using a best fit method.

19. An autostereoscopic display system as in claim 17, wherein pixels are selected using an averaging method.

* * * * *